United States Patent [19]
Chiles et al.

[11] Patent Number: 5,908,573
[45] Date of Patent: Jun. 1, 1999

[54] ELECTRIC FLOOR HEATING SYSTEM

[75] Inventors: Richard M. Chiles; Daniel T. Chiles, both of Springfield, Mo.

[73] Assignee: Bask Technologies LLC

[21] Appl. No.: 09/000,508

[22] Filed: Dec. 30, 1997

[51] Int. Cl.$^6$ ............................... H05B 3/34; H05B 1/00
[52] U.S. Cl. .......................................... 219/545; 219/213
[58] Field of Search .................................. 219/545, 213, 219/211, 212, 528, 549, 529; 404/71, 79

[56] References Cited

U.S. PATENT DOCUMENTS

| | | |
|---|---|---|
| 2,533,409 | 12/1950 | Tice . |
| 2,884,509 | 4/1959 | Heath . |
| 2,938,992 | 5/1960 | Crump . |
| 3,015,016 | 12/1961 | Cole . |
| 3,235,712 | 2/1966 | Watson . |
| 3,255,337 | 6/1966 | Willat . |
| 3,356,835 | 12/1967 | Watson . |
| 3,425,020 | 1/1969 | Toyooka et al. . |
| 3,627,988 | 12/1971 | Romaniec . |
| 3,721,800 | 3/1973 | Eisler . |
| 4,063,069 | 12/1977 | Peeri . |
| 4,071,052 | 1/1978 | Vasek et al. ............................... 139/436 |
| 4,363,947 | 12/1982 | Bergersen . |
| 4,439,666 | 3/1984 | Graham . |
| 4,538,054 | 8/1985 | de la Bretoniere . |
| 4,581,522 | 4/1986 | Graham . |
| 4,620,085 | 10/1986 | Horikawa et al. . |
| 4,733,057 | 3/1988 | Stanzel et al. . |
| 4,752,717 | 6/1988 | Mental . |
| 4,814,585 | 3/1989 | Klein . |
| 4,990,774 | 2/1991 | Smith, Jr. et al. . |
| 5,151,577 | 9/1992 | Aspden .................................. 219/528 |
| 5,218,185 | 6/1993 | Gross ..................................... 219/528 |
| 5,410,127 | 4/1995 | LaRue et al. ............................ 219/212 |
| 5,829,979 | 11/1998 | Kabashigawa ......................... 433/180 |

FOREIGN PATENT DOCUMENTS 0383152  8/1990  European Pat. Off. .

Primary Examiner—John A. Jeffery
Assistant Examiner—Vinod D Patel
Attorney, Agent, or Firm—Shook, Hardy & Bacon LLP

[57] ABSTRACT

An electrical heating system thin enough to be installed under finished flooring. A meshwork mat constructed in a leno configuration receives an electric heating element which is threaded through aligned openings in the twisted strands of the warp strands. The strands of the mat and the intersections between the criss-crossing warp and weft strands are coated with a polymeric fusing material. The heating element is arranged in side by side runs to minimize the electromagnetic field effects. Connecting runs between adjacent pairs of side by side runs are arranged linearly end to end. A return wire is extended adjacent to and side by side with the connecting runs.

11 Claims, 2 Drawing Sheets

ELECTRIC FLOOR HEATING SYSTEM

FIELD OF THE INVENTION

This invention relates generally to electrical heating and more particularly to an electric heating system having a meshwork mat which holds electrical heating elements and which is intended primarily for installation beneath finished floor coverings such as carpeting, ceramic tiles and wood flooring.

BACKGROUND OF THE INVENTION

Radiant floor heating has long been used for the heating of floors and/or occupied space above the floor. This type of heating system has advantages over other heating systems in several respects, most notably in the comfort level of the occupants. The heat from the floor naturally rises to provide a relatively uniform and draft free warmth. However, there are disadvantages as well. Hot air ducts that extend beneath the floor in order to warm it are subject to complexity and high construction costs and also require space for the ductwork.

Hydronic floor heating systems have become popular more recently. However, a hydronic system requires tubing which is typically installed in a concrete floor slab and connected to a pump and boiler system. Although a comfortable radiant heating effect is usually provided, these installation complexities generally restrict the use of hydronic systems to new construction and relatively large areas that are to be heated. They are usually not well suited for remodeling applications.

Electrically resistive heating systems having a meshwork structure which holds heating elements have been proposed for various heating applications. However, the systems that have been proposed in the past have not been suitable for floor heating applications for a variety of practical reasons. For the most part, they have been too thick to allow their use beneath floor covering materials. Also, connecting the electric heating elements to a source of power has presented significant problems both practically and aesthetically. Securely attaching the heating elements has been an additional problem. The tendency for the elements to generate significant electromagnetic fields has been another cause for concern.

SUMMARY OF THE INVENTION

The present invention is directed to an electrical heating system which includes an electrically heated mat that is thin enough to be readily installed on a sub-floor and beneath finished floor coverings such as carpet, tiles and wooden flooring.

It is a particular feature of the invention that the heating mat is well suited for renovation and remodeling applications as well as new construction. There is no need for piping, ductwork or other complicated mechanical installations that are ill suited for use in remodeling. Instead, the heating mat of the present invention can simply be laid out in the desired pattern on the sub-floor, and the finished flooring can be installed in the usual way. The presence of mesh openings in the mat is important in this respect, as it accommodates the mortar used for ceramic tile laying and the adhesives used to hold down wood flooring. The strands of the mat actually add reinforcement and tensile strength to tile floors due to the reinforcing effect that results when the strands are embedded in the mortar used to lay the tile.

The invention is particularly characterized by a construction that provides a strong and stable mat structure and secure attachment of the electric heating element to the mat. The mat is woven in a leno pattern that includes plural warp strands twisted around each other and the criss-crossing weft strands. This construction stabilizes and strengthens the mat to prevent it from exhibiting weakness if roughly handled. The mat is additionally strengthened by a polymer fusing material that coats all of the strands and the nodes at the intersections between the strands. The coating is melted and allowed to solidify such that it encapsulates all of the nodes and prevents displacement of the strands at these critical areas.

The heating mat is thin enough that it can be installed in one room without noticeably changing the floor level at the doorway to an adjacent room. The mat can also be installed in only a part of one room without creating a noticeable change in the floor level. Installation is simple and requires only an electrical connection to the building power source which can be easily established by an electrician after the heating mat has been completely installed beneath the floor covering. In this respect, supplying electrical power to the heating element is simplified by locating the lead wires to the element at one end of the mat, where connection to power leads can be made conveniently.

The heating element is arranged in a "spike" pattern that minimizes the electromagnetic field generated when the element is energized. The heating element arrangement includes side by side inward and outward runs that are held in aligned openings formed between the twisted warp strands of the mat. The fields in the two side by side runs essentially cancel each other. In addition, connecting runs from each inward run to the next outward run are arranged end to end in what is essentially a single line with the current flowing in the same direction in each connecting run. A return wire from the last inward run extends along one edge of the mat adjacent to the linearly arranged connecting runs, again essentially cancelling the electromagnetic fields. The return wire also allows the lead wires to be conveniently located at one end of the mat where the power leads can be connected without having to provide electrical access elsewhere on the mat.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
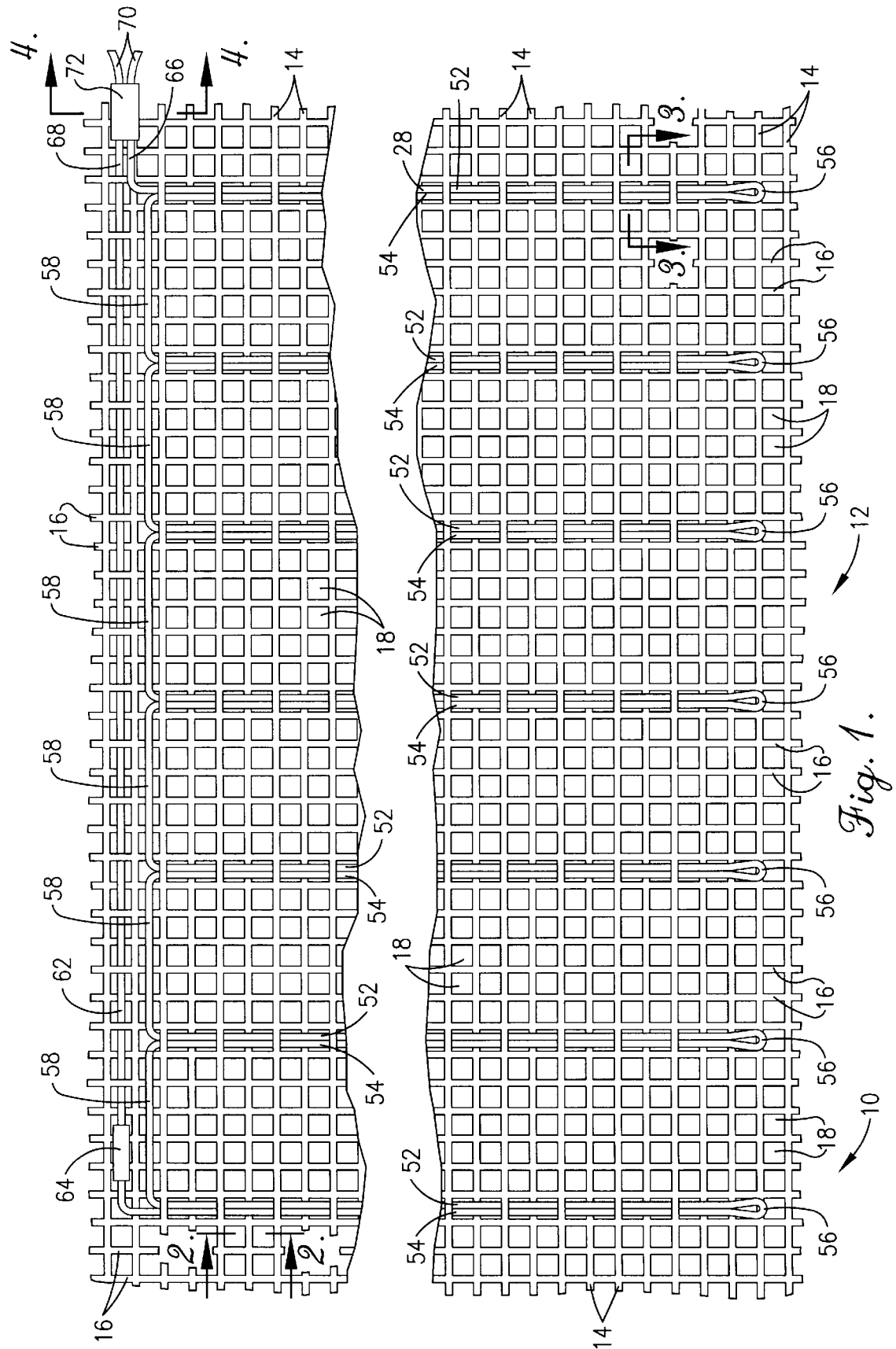
FIG. 1 is a fragmentary top plan view of a meshwork heating mat constructed according to a preferred embodiment of the present invention, with the break lines indicating continuous length.

Referring now to the drawings in more detail, the present invention is directed to a radiant electric heating system which is intended primarily for installation beneath finished flooring materials such as carpeting, ceramic tiles and wooden flooring. With initial reference to FIG. 1 in particular, the heating system includes an electrical heating mat which is generally identified by numeral 10. The mat 10 is formed by a flat scrim or mesh which is identified by numeral 12. The mesh 12 is formed by longitudinal warp strands 14 which are criss-crossed by and connected with a transverse weft strands 16.

The criss-crossing strands 14 and 16 present between them a plurality of square mesh openings 18. The mesh openings 18 should occupy a majority of the area of the mesh 12.

Figure 2:
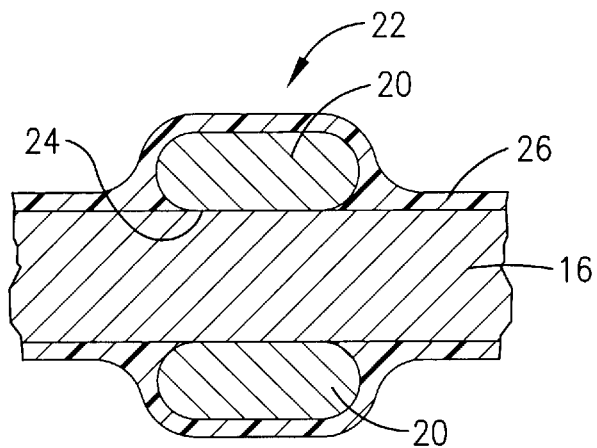
FIG. 2 is a fragmentary sectional view on an enlarged scale taken generally along line 2—2 of FIG. 1 in the direction of the arrows.

The criss-crossing warp strands 14 and weft strands 16 are woven together in a leno arrangement. As best shown in FIG. 2, each of the warp strands 14 is actually formed by a plurality of individual strands 20 which are twisted together around one another in the leno weaving procedure. At each location where a warp strand 14 intersects with a criss-crossing weft strand 16, a knot or node 22 is formed at the intersection. Each node 22 has a construction that includes the single weft strand 16 passing through a small passage 24 between the plural twisted strands 20 which form the warp strand. The strands 20 are thus twisted closely around the strand 16 at each intersection or node 22. This twisting or knotting of the warp strands around the weft strands strengthens and stabilizes the mat in the important area of the intersections between the strands. As a consequence, racking or shifting of the mat at the locations of the nodes during handling or installation is minimized.

With continued reference to FIG. 2 in particular, all of the warp and weft strands 14 and 16 are coated with a polymeric fusing material 26. The fusing material 26 may be of any desired type which can be applied to the mat 12 and which melts at a suitable temperature when the mat is subjected to heat in an oven or elsewhere. The melted fusing material 26 runs and surrounds each of the nodes 22 such that the nodes are embedded or encapsulated in the fusing material 26 when the heating process has been completed and the material 26 solidifies. In this manner, the material 26 fuses all of the strands together at each node 22 in order to strengthen the nodes and prevent the strands from slipping.

The mat 10 is heated by an electrically resistive heating element 28. The element 28 is woven to the mesh 12 in a preselected pattern during the weaving process. The element 28 preferably takes the form of a single elongated electrical wire covered by suitable insulation.

FIG. 1 best depicts the pattern in which the heating element 28 is woven to and arranged on the openwork mesh 12. The element 28 is arranged with a plurality of outwardly extending runs 52 extending adjacent to and side by side with corresponding inwardly extending runs 54. The outwardly extending runs 52 extend transversely along the mat from near one edge to a location near the opposite edge. The inwardly extending runs 54 extend in the opposite direction from the far edge to a location near the other edge. The element 28 is looped at locations 56 where each outward run turns and merges with the adjacent inward run 54. The loops 56 are located near one edge of the mat. Near the opposite edge of the mat 12, each inwardly extending run 54 is connected with the next outwardly extending run 52 by a straight connecting run 58 which extends a short distance in a direction longitudinally along the mat. The connecting runs 58 are arranged end to end to form essentially a straight line extending along one edge of the mat.

Figure 3:
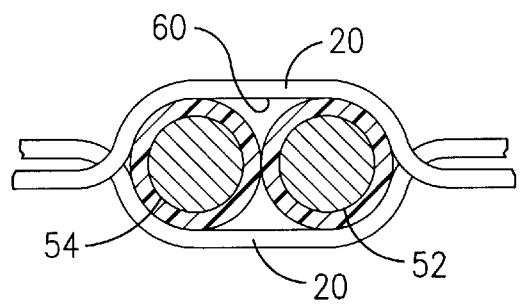
FIG. 3 is a fragmentary sectional view on an enlarged scale taken generally along line 3—3 of FIG. 2 in the direction of the arrows.

The manner in which the outward and inward runs 52 and 54 are woven to the mat 12 to mount the heating element 28 is best shown in FIG. 3. The twisted strands 20 which form the warp of the leno pattern have the loops 58 and the runs 52 and 54 pushed through and between them by a rapier (not shown) used in the weaving process. Each pair of runs 52 and 54 is thus inserted through aligned openings or passages 60 formed between the strands 20 as the heating element is inserted between them. This secures the heating element 28 to the mat and assures that the pairs of runs 52 and 54 remain side by side and adjacent to one another to minimize the net electromagnetic field effect. The connecting runs 58 can be woven alternately over and under the weft strands 16 to hold the connecting runs in place.

The side by side arrangement of the runs 52 and 54 is important in that it results in a significant reduction in the net electromagnetic field that is generated when electrical current is passed through the heating element 28. Because the current flows in opposite directions through the adjacent runs 52 and 54, the electromagnetic fields that surround the runs 52 and 54 essentially cancel one another out.

The last inward run 54 (appearing farthest to the left in FIG. 1) connects with a return wire 62 through a suitable connection 64. The return wire 62 is woven through the mesh openings 18 alternately over and under the weft strands 16. Wire 62 extends generally along the edge of the mat 12 and is adjacent to and side by side with the connecting runs 58 of the heating element. The current flowing through the connecting runs 58 is opposite in direction to the current flowing through the return wire 62, so the electromagnetic fields in runs 58 and wire 62 essentially cancel one another.

One "cold" lead wire 66 is formed at the end of the initial outward run 52. Another "cold" lead wire 68 is formed at the end of the return wire 62. The provision of the return wire 62 on the mat allows the two cold leads 66 and 68 to be located adjacent to each other at one end of the mat. This avoids the need, during installation, for one lead to be recovered and to be routed in the field back to connection with the electrical supply.

Figure 4:
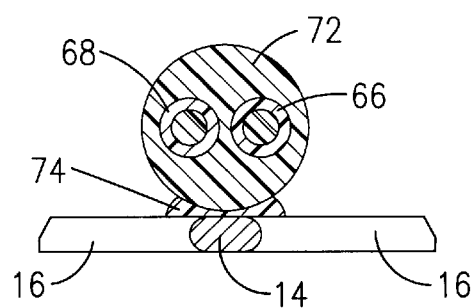
FIG. 4 is a fragmentary sectional view, taken generally along line 4—4 of FIG. 1 in the direction of the arrows.

The "cold" lead wires 66 and 68 are connected with power leads 70 which connect with the building power supply to provide electrical power to the cold lead wires 66 and 68 for energization of the heating element 28. A connection sleeve 72 is used to electrically connect the power leads 70 with the cold leads 66 and 68, and to mechanically connect the wires to each other and to the mat 12. The sleeve 72 is applied around the ends of the power leads 70 and around the ends of the cold lead wires 66 and 68 which are suitably connected to the power leads 70 within the sleeve. The sleeve 72 is constructed of a suitable insulating material. As shown in FIG. 4, the sleeve 72 is bonded to the strands 14 and 16 by a suitable bonding agent 74 which may be melted and then allowed to solidify to provide a strong bond between the sleeve 72 and the mat 12, thus preventing the lead wires from being worked loose during handling or installation of the mat.

The heating system is installed by selecting the mat 12 which has the appropriate length and width and placing it on the sub-floor. The power leads 70 can be suitably connected to supply electrical power from the building power supply system.

Floor coverings such as carpeting, wooden flooring slats or ceramic tiles may be installed over the mat 10. For example, the installation of ceramic tiles can be carried out normally. "Thin set" mortar can be applied to the sub-floor through the mesh openings 18 to establish good surface area contact between the mortar and the sub-floor. The mesh 12 will be embedded in the mortar, and tiles can then be set into the mortar to completely cover the mat 10. When the installation has been completed, the mat is located totally under the finished flooring surface and is not visible. The strands 14 and 16 provide reinforcement to the mortar to strengthen it and reduce any tendency for the mortar to crack.

When the electrical system is energized, current is applied through the power leads 70 to the heating element 28. The element 28 includes an electrically resistive wire which generates heat for heating of the meshwork mat. Consequently, the heat that is generated by the heating system is applied to the overlying tiles (or other finished flooring material) and then radiates into the room above the flooring, rising naturally due to convective effects.

The heating system can be used as a primary heating system for the room, as a secondary or supplemental heating system which adds to the heat provided by another heating system, or it can be used simply to heat the flooring of a room in which the heating is already adequate. In any case, the heating system operates safely, economically and reliably to generate heat. If the system is used as the primary heating system for a particular room, a thermostat should ordinarily be installed to sense the air temperature so that the heating system is activated whenever the air temperature is lower than the temperature set on the thermostat.

It is contemplated that one of the principal uses for the heating system will be in remodeling applications. It is noted that there is no need for underfloor ductwork, piping or other complicated mechanical installations at locations where access is difficult. Rather, the mat 10 can simply be laid on top of the sub-floor and there is no need to install any mechanical equipment. It is also contemplated that the system will find significant application in small rooms such as bathrooms. In this case, it is normally not necessary to underlie the complete floor of the room but only the main area. Some areas can be left unheated, particularly those extending along walls. It may be desirable to provide the mat in the area in front of a vanity or sink where the occupants often stand for considerable periods of time.

When installed in halls and other rooms, there is usually no need to place the heating mat any closer than about 12"–16" to the walls. However, in living rooms and other living areas, it may be desirable to place the mat in the area in front of couches or chairs where the feet of the occupants are often placed.

It should be noted that the heating mat 10 is characterized by a thin construction which makes it particularly useful for installation beneath finished floor coverings, including tiles, carpet and wood planks. However, the heating system can also be installed in other locations such as on walls or wherever else desired and where a thin structure is important or necessary.

Connecting the heating element 28 in a spike pattern as described using a rapier during the weaving process allows the mat to be constructed in virtually any desired length, in contrast to the length limitations of "bobbin" type weaving techniques. The heating element 28 preferably has a high temperature polymeric insulation that is able to withstand the temperatures that are required to fuse the coating 26 on the strands 14 and 16 and the nodes 22. Preferably, the exterior color of the element 28 contrasts vividly with the color of the mat 12. This decreases the likelihood of the element 28 being inadvertently cut during efforts to cut the strands of the mat.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, we claim:

1. Electrical heating apparatus for installation on a sub-floor beneath finished flooring, said apparatus comprising:

a thin mesh mat which includes criss-crossing strands connected together to present mesh openings in the mat;

an electric heating element secured to the mat and including a plurality of side by side outward and inward runs adjacent to one another to reduce electromagnetic fields generated when the element is energized, said element including a plurality of connecting runs extending adjacent to one edge of the mat and connecting each of the inward runs with the next successive outward run;

a return wire connected with a final inward run and extending along said one edge of the mat adjacent to said connecting runs;

power leads for applying electrical power to said element; and means for connecting said power leads with an initial outward run and with said return wire.

2. Apparatus as set forth in claim 1, including polymeric fusing material coating said strands and intersections between the strands.

3. Apparatus as set forth in claim 1, wherein said strands include warp and weft strands woven in a leno arrangement having plural warp strands twisted together and twisted around the weft strands.

4. Apparatus as set forth in claim 3, including polymeric fusing material coating said strands and intersections between the warp and weft strands to stabilize and strengthen said intersections.

5. Apparatus as set forth in claim 3, wherein:

said warp strands prevent aligned openings therebetween at locations between adjacent weft strands; and said outward and inward runs of the heating element pass through said aligned openings to attach said element to said mat.

6. Electrical heating apparatus for installation on a sub-floor beneath finished flooring, said apparatus comprising:

a thin mesh mat which includes warp and weft strands woven in a leno arrangement having plural warp strands twisted together and connected with weft strands criss-crossing the warp strands, said plural warp strands presenting aligned openings therebetween at locations between adjacent weft strands;

an electric heating element arranged in a plurality of pairs of outward and inward runs with the outward and inward runs in each pair located side by side and passing through said aligned openings to attach said element to said mat; and power leads connected to said heating element for applying electrical power thereto.

7. Apparatus as set forth in claim 6, including:

a plurality of connecting runs of said heating element extending adjacent to one edge of said mat and connecting each of the inward runs with the next successive outward run; and a return wire connected with a final inward run and extending along said one edge of the mat adjacent to said connecting runs.

8. Apparatus as set forth in claim 6, including:

a plurality of intersections between said warp and weft strands at which said plural warp strands are twisted around and secured to the weft strands; and polymeric fusing material coating said strands and said intersections to stabilize and strengthen the intersections.

9. Electrical heating apparatus for installation on a subfloor beneath finished flooring, said apparatus comprising:

a thin mesh mat which includes criss-crossing warp and weft strands woven together in a leno configuration in which plural warp strands are twisted together and twisted around the weft strands at intersections therebetween;

polymeric fusing material coating said strands and fused on said intersections to stabilize and strengthen said intersections;

an electric heating element secured to the mat and including a plurality of side by side outward and inward runs adjacent to one another to reduce electromagnetic fields generated when said element is energized; and electric power leads connected to said heating element for applying electric power thereto.

10. Apparatus as set forth in claim 9, wherein:

said warp strands prevent aligned openings therebetween at locations between adjacent weft strands; and said outward and inward runs of the heating element pass through said aligned openings to attach said element to said mat.

11. Apparatus as set forth in claim 9, including:

a plurality of connecting runs of said heating element extending adjacent to one edge of said mat and connecting each of the inward runs with the next successive outward run; and a return wire connected with a final inward run and extending along said one edge of the mat adjacent to said connecting runs.

* * * * *